United States Patent [19]

Mizuno et al.

[11] Patent Number: 4,940,914
[45] Date of Patent: Jul. 10, 1990

[54] VIBRATION ABSORBING APPARATUS

[75] Inventors: Keiichiro Mizuno, Tokyo; Kazuyoshi Iida, Yokohama, both of Japan

[73] Assignee: Bridgestone Corporation, Tokyo, Japan

[21] Appl. No.: 194,371

[22] Filed: May 16, 1988

[30] Foreign Application Priority Data

May 26, 1986 [JP] Japan .................. 62-129474

[51] Int. Cl.⁵ .................................. H01L 41/08
[52] U.S. Cl. ...................... 310/326; 310/316
[58] Field of Search ............ 310/311, 321, 323, 325, 310/328, 51, 326, 327, 316, 317, 319; 248/636, 638

[56] References Cited

U.S. PATENT DOCUMENTS

| 3,179,823 | 4/1965 | Nesh | 310/326 X |
| 4,158,787 | 6/1979 | Forward | 310/326 X |
| 4,197,478 | 4/1980 | Silvus | 310/326 X |
| 4,363,991 | 12/1982 | Edelman | 310/316 |
| 4,565,940 | 1/1986 | Hubbard, Jr. | 310/326 |
| 4,626,730 | 12/1986 | Hubbard, Jr. | 310/326 |

FOREIGN PATENT DOCUMENTS

61-14340 1/1986 Japan .

Primary Examiner—Mark O. Budd
Attorney, Agent, or Firm—Sughrue, Mion, Zinn, Macpeak & Seas

[57] ABSTRACT

A vibration absorbing apparatus for reducing vibrations of a vibration damping objective comprises a vibration member excited by a piezo-ceramic element. The voltage applied to the piezo-ceramic element is controlled in accordance with the vibration state of the objective.

6 Claims, 6 Drawing Sheets

FIG. 1

FIG_2

FIG_3

FIG_4

FIG_5

FIG_6

FIG_7

FIG_8
PRIOR ART

FIG_9

FIG_10
PRIOR ART

FIG_11

FIG_12

FIG_13

FIG_14
PRIOR ART

FIG_15
PRIOR ART

VIBRATION ABSORBING APPARATUS

BACKGROUND OF THE INVENTION

1. Field of the Invention

This invention relates to a vibration absorbing apparatus which can change vibration absorbing characteristics in accordance with a vibration state of a vibration damping objective to positively absorb the vibration of the objective.

2. Related Art Statement

In engine mounts, power machines and the, like, vibration, and noise are severely restricted because of the demand for high speed and high power, and consequently countermeasure for the reduction of vibrations always are required in connection with the enhancement of performance in the machinery and equipment. A vibration absorbing apparatus (i.e., dynamic damper) has been adopted as a countermeasure for the reduction of vibrations.

In this dynamic damper, additional mass is connected to a vibration damping objective (mass of a main vibration system) through a spring and a frequency of vibration of normal mode in the secondary vibration system consisting of the spring and additional mass is properly selected, whereby the vibration of the objective is mitigated.

In the conventional vibration absorbing apparatus, however, it is necessary to select the additional mass to be at least 10% of the vibration damping objective (main mass), so that there is a problem that the weight of the vibration absorbing apparatus itself becomes heavier.

Furthermore, a large vibration absorbing effect is obtained at a particular frequency range, but this effect rapidly decreases when the frequency is outside the above range and there is rather caused such a phenomenon that the vibration absorption is inversely degraded at both frequency regions outside the aforementioned frequency range.

Figure 14:
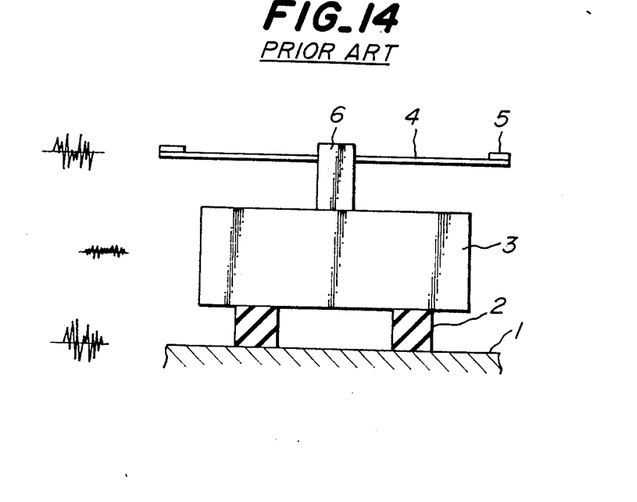
FIG. 14 is a diagrammatic side view of the conventional vibration absorbing apparatus.
Figure 15:
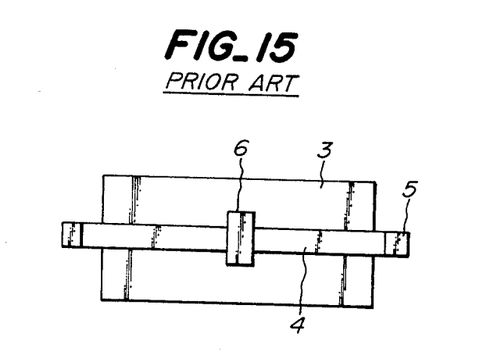
FIG. 15 is a plan view of FIG. 14.

FIG. 14 shows a side view of the conventional vibration absorbing apparatus, and FIG. 15 is a plan view of FIG. 14.

In FIG. 14, large vibrations are transmitted from a base 1 through a vibration damping member 2 to a vibration damping objective 3, for example, a precision machinery body, a computer or a support therefor.

Although vibration damping is performed at least through the vibration damping member 2, there is a point producing a very large vibration in a certain frequency range, i.e. a resonance point, which can not be removed only by the vibration damping member 2.

As a conventional countermeasure, therefore, a band plate type vibration member 4 or the member 4 having a spring property and provided at each end with an additional mass 5 is attached to the vibration damping objective 3 through a support member 6 to thereby absorb the vibration energy of the vibration damping objective by the vibration system consisting of the spring of the member 4 (bending vibration) and the additional mass 5.

When using such a vibration absorbing apparatus, however, the mass of the secondary vibration system consisting of the spring type vibration member 4 and the additional mass 5 is required to be set to at least 10% of the vibration damping objective 3 (main mass), so that the weight of the vibration absorbing apparatus itself becomes undesirably larger. Also, even if the spring characteristic of the secondary vibration system is properly set, the vibration absorbing effect is merely obtained at the particular frequency range.

SUMMARY OF THE INVENTION

It is, therefore, an object of the invention to solve the aforementioned problems of the conventional techniques and to provide a vibration absorbing apparatus which can adjust the vibration absorbing characteristics in accordance with the vibration state of the vibration damping objective without needing the heavy additional mass as in the conventional technique and can reduce vibrations of the vibration damping objective at any frequency range.

According to the invention, there is the provision of a vibration absorbing apparatus, characterized in that a vibration member excited by a piezo-ceramic element is attached to a vibration damping objective and a voltage applied to the piezo-ceramic element is controlled in accordance with the vibration state of the objective to reduce vibrations of the objective.

According to the vibration absorbing apparatus of the above construction, the piezo-ceramic element converting electric vibration into dynamic vibration is further arranged in the secondary spring system and the vibration state of the vibration damping objective is detected by means of a sensor, so that the voltage applied to the piezo-ceramic element can be controlled based on the detected signal and consequently the vibration state of the secondary spring system can be controlled to an appropriate value in accordance with the vibration state of the vibration damping objective (main mass).

DESCRIPTION OF THE PREFERRED EMBODIMENT

The invention will be described in detail with reference to FIGS. 1~13.

Figure 2:
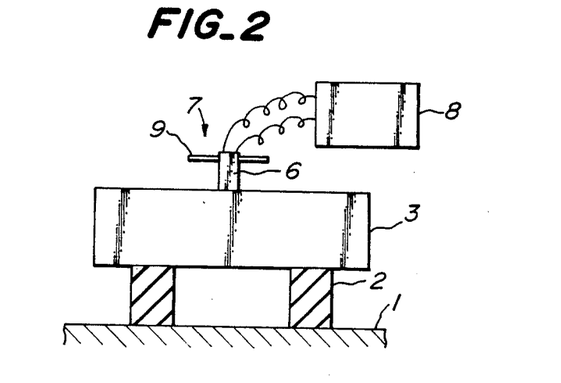
FIG. 2 is a diagrammatic side view of the vibration absorbing apparatus of FIG. 1.
Figure 3:
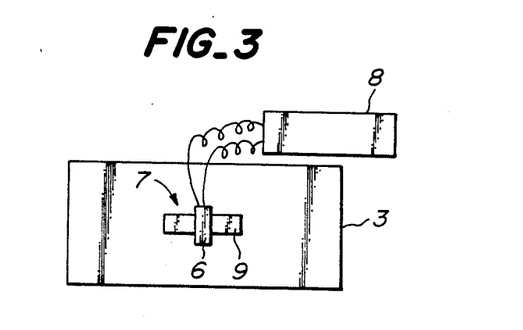
FIG. 3 is a plan view of FIG. 2.

FIG. 2 is a side view showing an outline of a first embodiment of the vibration absorbing apparatus according to the invention and FIG. 3 is a plan view of FIG. 2.

In FIGS. 2 and 3, a vibration damping objective 3 such as precision machinery body, computer, instrument or a stand supporting thereof is supported by a base 1 through a vibration damping member 2.

As the vibration damping member 2, use may be made of an ordinary rubber isolator, a laminated rubber support obtained by alternately and integrally laminating rubbery elastic sheets and reinforcing plates, coil springs, air springs, and the like. This laminated rubber support may be used alone or as a multistage vibration-isolating support structure obtained by connecting plural laminated rubber supports to each other through connecting discs in the same plane and piling the connected bodies at plural stages (e.g. 5~10 stages) in up and down directions.

The above multistage vibration-isolating support structure has previously been disclosed in Japanese Patent laid open No. 61-14,340.

In FIGS. 2 and 3, a support portion 6 for the attachment of a vibration absorbing apparatus is arranged on the upper face of the vibration damping objective 3, and a vibration damping apparatus comprising a piezo-actuator 7 according to the invention is attached to the support portion 6.

The operation of the piezo-actuator 7 is electrically controlled by a control circuit 8.

Figure 4:
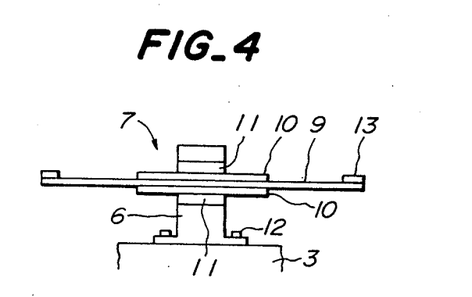
FIG. 4 is a side view showing a detailed structure of a piezo-actuator of FIG. 2.

FIG. 4 shows a detailed structure of the piezo-actuator 7.

In FIG. 4, a vibration member 9 composed of a band-like vibration plate is formed by a continuous material protruding outward from the support portion at both sides. Furthermore, piezo-ceramic elements 10, 10 are bonded to the upper and lower surfaces of the vibration member 9 at the base part (central part) thereof.

The vibration member 9 is attached to the vibration damping objective 3 by clamping the piezo-ceramic elements 10, 10 from both sides thereof through clamps 11 arranged in the support portion 6.

Moreover, the support portion 6 is fixed to the vibration damping objective 3 by a fastening means such as bolts 12 and the like.

As shown in FIG. 4, an additional mass 13 is attached to a tip (both side ends) of the vibration member 9. This additional mass serves to adjust the natural frequency of the vibration member 9 in accordance with the magnitude and the attached position. In the invention, the additional mass 13 is not necessarily used.

The vibration member 9 is constructed by a material having a spring property such as a band-like leaf spring made from a metal, a plastic or the like.

The piezo-ceramic element is a member converting electric vibration (alternating voltage or the like) into dynamic vibration (vibration applying force). As a material of the piezo-ceramic element, a mechanically strong barium titanate and its similar porcelain substance such as PZT (titanium lead zirconate) or the like are used, and also Rochelle salt or the like may be used.

As shown in FIGS. 2 and 3, the piezo-ceramic element 10 and the vibration member 9 in the piezo-actuator 7 are connected to the control circuit 8 through electrodes (or lead wires). For instance, when an alternating voltage of about 100~500 volts is applied to the piezo-actuator, mechanical (dynamic) vibrations are produced to excite the vibration member 9.

The control circuit 8 is constructed so as to reduce the vibration transmitted from the base 1 to the vibration damping objective 3 by the vibration of the vibration member 9.

Figure 1:
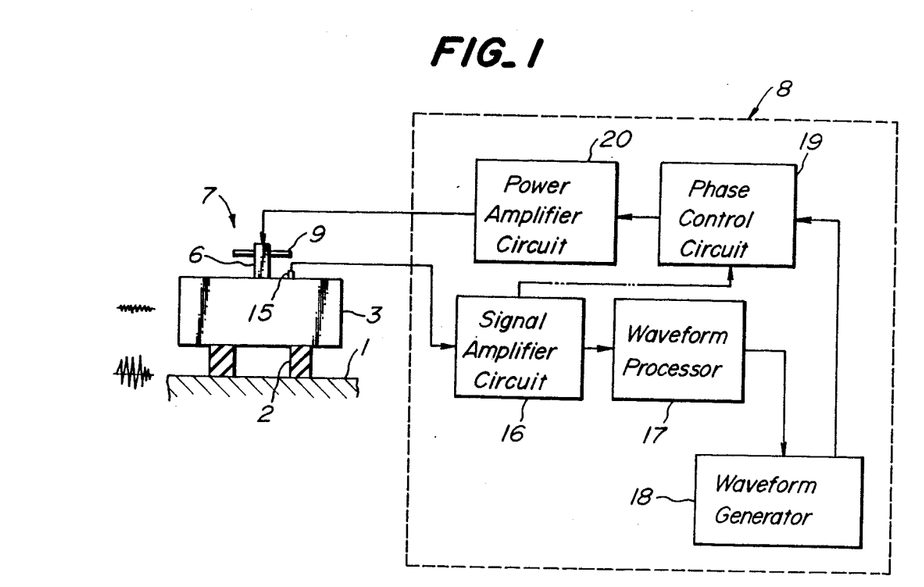
FIG. 1 is a block diagram showing a construction of a first embodiment of the vibration absorbing apparatus according to the invention.

FIG. 1 shows the construction of the control circuit 8 shown in FIG. 2.

As shown in FIG. 1, a sensor 15 for detecting the vibration state is attached to the vibration damping objective 3. A waveform signal output from the sensor 15 is amplified through a signal amplifier circuit 16 and input to a waveform processor 17.

In the waveform processor 17, the waveform signal is analyzed so as to determine immediately what frequency region is most predominant, and a signal corresponding to that region region is transferred into a waveform generator 18.

The waveform generator 18 produces a waveform of predominant frequency based on the above region signal.

The waveform from the waveform generator 18 is transferred to a phase control circuit 19, in which the phase of the waveform is adjusted so as to reduce the vibration of the main mass 3.

The thus phase-adjusted waveform signal is amplified through a power amplifier circuit 20 into an alternating driving voltage, which is then applied to the piezo-ceramic element 10 (FIG. 4).

The piezo-ceramic element 10 produces vibrations of a mode corresponding to the applied voltage to excite the vibration member 9. If the additional mass 13 (FIG. 4) is employed, vibrations including these masses are produced.

When the vibration member 9 (and the additional mass 13) is excited, vibrations based on the reaction force thereof is transmitted to the vibration damping objective 3 through the fixed clamp 11 (FIG. 4) and the support portion 6 to cause a vibration absorbing effect controlling the vibration of the objective 3, whereby the vibration of the objective (main mass) 3 is reduced. This vibration reducing effect is largest in the frequency range near the natural frequency determined by the vibration member 9 and the additional mass 13.

Moreover, it is preferable that a noise component be removed by arranging a filter circuit (not shown) behind the signal amplifier circuit 16 in accordance with the vibration state of the vibration damping objective 3. This filter circuit is generally included in the waveform processor circuit.

Furthermore, in accordance with the vibration state of the vibration damping objective 3, it is possible that vibration control can be performed by omitting the waveform processor 17 and the waveform generator 18 and directly inputting the waveform signal from the signal amplifier circuit 16 to the phase control circuit 19 as shown by a phantom line in FIG. 1. In this case, it is necessary to pass the signal from the signal amplifier circuit 16 through the filter circuit.

Figure 5:
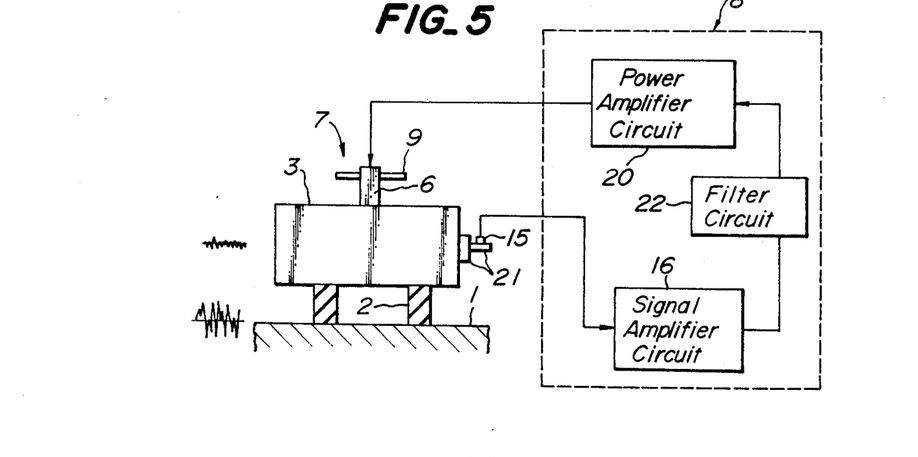
FIG. 5 is a diagrammatic side view of a modified embodiment of FIG. 1 in the vibration absorbing apparatus according to the invention.

FIG. 5 shows a modified embodiment of the control circuit 8 shown in FIG. 1.

As shown in FIG. 5, a portion 21 generating properly shifted vibration (waveform) signals for reducing the vibration of the vibration damping objective 3 (control of phase by structural components) is arranged to the objective 3 and the vibration of the portion 21 is detected by a sensor 15. The portion 21 can be composed of, for example, a combination of rubber, metal and high polymer material.

The control circuit 8 of FIG. 5 is constructed so that the waveform signal from the sensor 15 is amplified through a signal amplifier circuit 16, passed through a filter circuit 22 removing noise and thereafter directly input to a power amplifier circuit 20, and an alternating driving voltage amplified by the power amplifier circuit is applied to the piezo-ceramic element 10 (FIG. 4).

The circuit construction can be simplified by the control circuit 8 of FIG. 5 as compared with the case of FIG. 1.

In order to realize the simplification of the control circuit 8 as shown in FIG. 5, however, it is required to accurately measure and examine the vibration state of the vibration damping objective 3.

Figure 6:
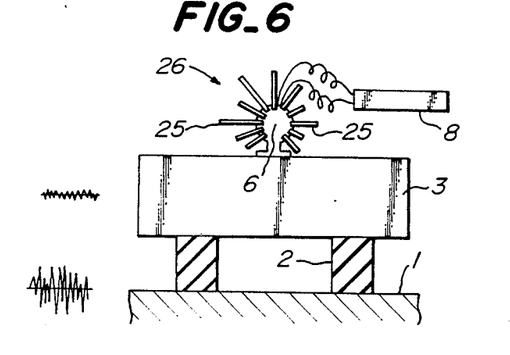
FIG. 6 is a block diagram showing a structure of a second embodiment of the vibration absorbing apparatus according to the invention.
Figure 7:
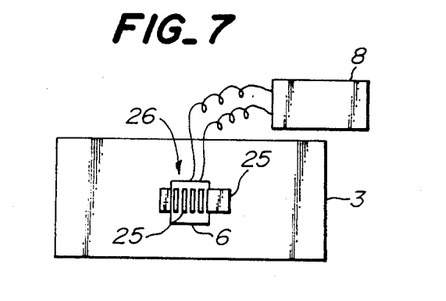
FIG. 7 is a plan view of FIG. 6.

FIG. 6 is shows a second embodiment of the vibration absorbing apparatus according to the invention, and FIG. 7 is a plan view of FIG. 6.

In the second embodiment, the support portion 6 arranged on the vibration damping objective 3 is shaped into a cylinder, and plural notches are formed on the surface of the cylinder at a predetermined pitch in the peripheral direction thereof. Then, a vibration member 25 provided with a piezo-ceramic element is fitted into each of these notches, whereby a piezo-actuator unit 26 composed of plural piezo-actuators provided with cantilever-type plural vibration members having different lengths is constructed.

In this case, the vibration members 25 are arranged by a combination of vibration plates having different lengths, a combination of vibration plates each having an additional mass 13 (FIG. 4) at its end and vibration plates having no additional mass, a combination of vibration plates having different additional masses, or the like.

The piezo-ceramic element (not shown) bonded to the base part of each of these vibration members 25 is connected to the same control circuit 8 as shown in FIG. 1 or 5 through electrodes or lead wires.

Therefore, the vibration of the vibration damping objective 3 is reduced by controlling the excitation of these vibration members 25 (which may include the additional mass) in accordance with the vibration state of the objective 3.

According to the vibration absorbing apparatus of FIGS. 6 and 7, not only are the same function and effect as in the vibration absorbing apparatus of FIGS. 1~5 obtained, but also the large vibration absorbing effect based on the plural piezo-actuators having different natural frequencies can be developed because plural vibration members 25 are used and the length of each vibration member and the presence or absence of the additional mass can properly be varied.

Thus, vibrations over a wide and different frequency range can effectively be reduced by simultaneously applying a predetermined voltage through the single control circuit 8.

Figure 8:
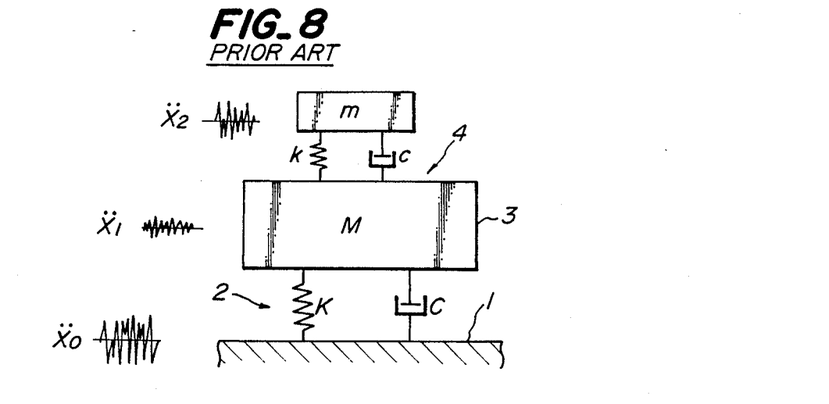
FIG. 8 is a block diagram showing a vibration model of the conventional vibration absorbing apparatus.
Figure 9:
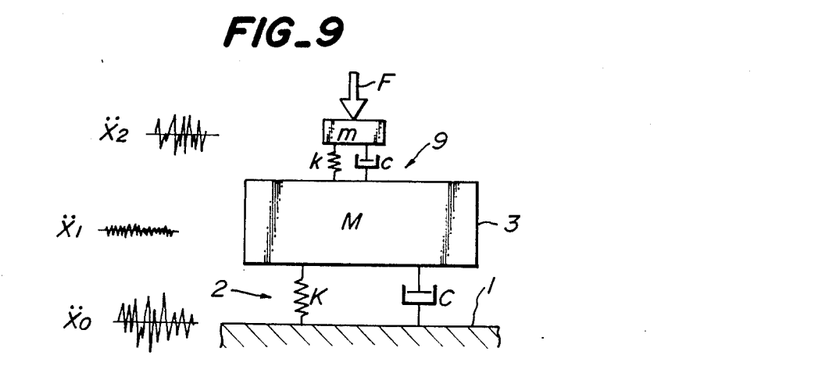
FIG. 9 is a block diagram showing a vibration model of the vibration absorbing apparatus according to the invention.

FIG. 8 shows a vibration model of the conventional vibration absorbing apparatus shown in FIGS. 14, and 15, while FIG. 9 shows a vibration model of the vibration absorbing apparatus according to the invention (FIGS. 1~7).

In FIG. 8, m corresponds to a total mass of the vibration member 4 and the additional mass 5, k corresponds to a spring portion of the vibration member (spring member) 4, and c corresponds to a vibration damping portion of the vibration member 4.

Furthermore, in FIG. 8, M is a mass of the vibration damping objective 3, and K and C are a spring portion and a vibration damping portion of the vibration damping member 2, respectively.

On the other hand, in FIG. 9, m is a mass of the vibration member 9 or a total mass of the vibration member 9 and the additional mass 13 (FIG. 4), k and c are a spring portion and a vibration damping portion of the vibration member 9, respectively, M is a mass of the vibration damping objective 3, K and C are a spring portion and a vibration damping portion of the vibration damping member 2, respectively, and F is an excitation force applied to the vibration member 9 by dynamic vibration of the piezo-ceramic element 10 (FIG. 4).

In FIGS. 8 and 9, when a vibration acceleration $X_0$ is applied from the base 1 to the vibration damping objective (main mass) 3, this objective 3 vibrates at an acceleration $X_1$. In this case, the additional mass 5 (FIG. 14) vibrates at an acceleration $X_2$ in the conventional structure of FIG. 8, while the vibration member 9 or the additional mass 13 (FIG. 4) possibly existent thereon vibrates at an acceleration $X_2$ in the structure of FIG. 9.

In these cases, the effect of reducing vibrations is generally represented by a ratio of vibration acceleration transmitted from the base 1 to the vibration damping objective 3 or a vibration transmissibility of $|X_1/X_0|$. The smaller the value, the better the vibration reducing effect.

FIGS. 10~13 are graphs showing a frequency characteristic of vibration transmissibility in various vibration absorbing apparatuses, respectively.

Figure 10:
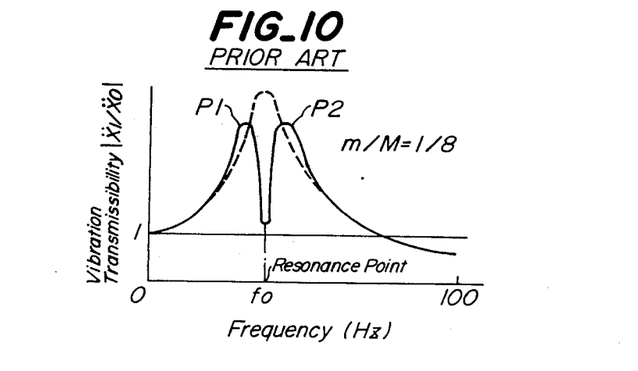
FIG. 10 is a graph showing a frequency characteristic of vibration reducing effect in the conventional vibration absorbing apparatus.

FIG. 10 shows the vibration transmissibility of the conventional vibration absorbing apparatus shown in FIGS. 14 and 15.

According to FIG. 10, a relatively large vibration reducing effect (for example, reduction of about 15 dB) is obtained at a resonance point $f_0$ by properly adjusting the vibration member (spring member) 4 and the additional mass 5, but portions P1 and P2 degrading the vibration reducing effect are produced on either side thereof, within a frequency range about the resonance point.

Furthermore, in the conventional apparatus of FIG. 10, the sufficient reduction effect is first obtained when a ratio of the additional mass m to mass (main mass) M of the vibration damping objective is ensured to be about ⅓, but the weight of the vibration absorbing apparatus becomes fairly heavy.

Figure 11:
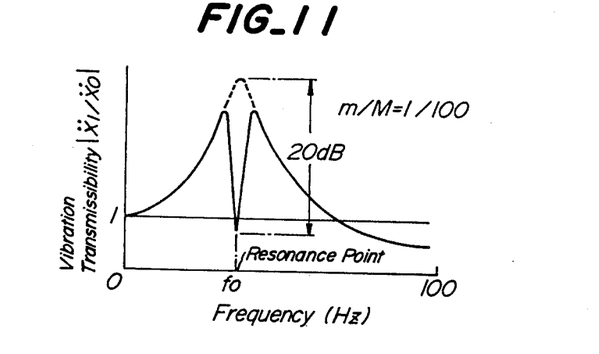
FIG. 11 is a graph showing a frequency characteristic of vibration reducing effect in the first embodiment of the vibration absorbing apparatus according to the invention.
Figure 12:
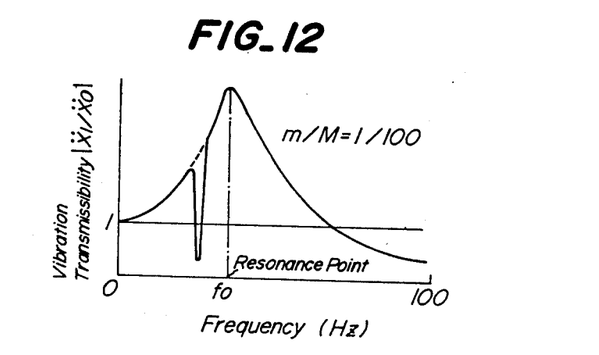
FIG. 12 is a graph illustrating the frequency characteristic of vibration reducing effect when controlling the voltage of piezo-actuator in FIG. 11.

FIGS. 11 and 12 show the vibration reducing effect of the vibration absorbing apparatus in the first embodiment of the invention, respectively.

FIG. 11 is a case that a voltage corresponding to a frequency near to a resonance point $f_0$ of a portion (piezo-actuator) of the vibration absorbing apparatus is applied to the piezo-ceramic element 10 (FIG. 4).

In this case, the larger vibration reducing effect (for example, reduction of about 20 dB) is obtained as compared with that of the conventional apparatus (FIG. 10)

by adequately adjusting the phase control circuit 19 of FIG. 1.

As seen from FIG. 11, there is not caused the phenomenon that the vibration reducing effect is degraded at both-side frequency ranges about the resonance point as in the conventional apparatus (P1, P2 in FIG. 10).

Furthermore, when the frequency of the voltage applied to the piezo-ceramic element 10 (FIG. 4) is changed to conduct the phase adjustment, vibrations at an arbitrary frequency range different from the resonance point $f_0$ can be reduced as shown in FIG. 12. This can automatically be controlled by the control circuit 8. In this case, however, it is necessary to adjust the magnification of the additional mass and the arranging position thereof as well as the natural frequency of the secondary vibration system consisting of the vibration member 9 and the additional mass 13 in order to obtain the maximum effect.

Therefore, the vibration absorbing apparatus according to the invention is particularly effective for the vibration damping countermeasure of engine bodies and the like when the engine revolution number is varied to change noise inside the room of the vehicle.

Furthermore, the highest merit of the vibration absorbing apparatus according to the invention lies in that the vibrations can effectively be reduced even when the ratio of additional mass m to the main mass M is m/M =about 1/100, so that the vibration absorbing apparatus having a super-light weight can be realized.

Figure 13:
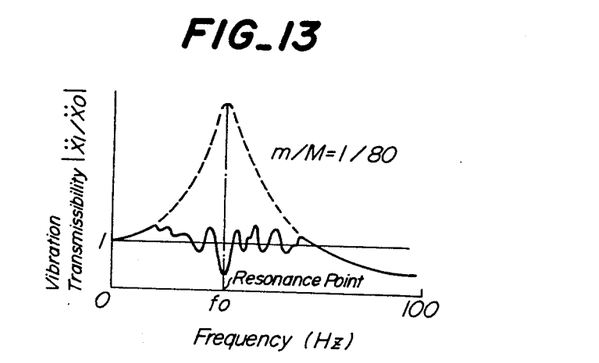
FIG. 13 is a graph showing a frequency characteristic of vibration reducing effect in the second embodiment of the vibration absorbing apparatus according to the invention.

FIG. 13 shows the frequency characteristic of vibration transmissibility when the vibration absorbing apparatus in the second embodiment of the invention is used, that is, when the plural piezo-actuators (vibration members) 25 as shown in FIGS. 6 and 7 are simultaneously driven.

Namely, according to the embodiment of FIGS. 6 and 7, super-light weight vibration absorbing apparatuses having a ratio of additional mass m to main mass (vibration damping objective) M of 1/80 can be obtained. Furthermore, vibrations at the single frequency range of vibration applied to the main mass 3 as well as various different frequency ranges corresponding to the vibration plates 25 as shown in FIG. 13 can simultaneously be reduced.

Therefore, even when the frequency spectrum distribution of vibration has a relatively uniform property, vibrations over a wide frequency range can simultaneously and easily be reduced by controlling the voltage applied to the piezo-ceramic element.

As mentioned above, according to the invention, the vibration member excited by the piezo-ceramic element is attached to the vibration damping objective and the voltage applied to the piezo-ceramic element is controlled in accordance with the vibration state of the objective to reduce the vibration of the objective, so that the weight of the apparatus can be made light, and further the reduction of vibrations at the desired frequency range can easily and effectively be performed by the control of the applied voltage.

What is claimed is:

1. A vibration absorbing apparatus for absorbing vibrations of a vibration damping objective, comprising:
   a support member attached to said vibration damping objective and having a plurality of notches formed therein;
   a plurality of vibration members fitted in said notches of said support member, said vibration members being of different lengths;
   a plurality of piezo-ceramic elements each attached to a base of a respective one of said vibration members;
   detecting means for detecting movement of said vibration damping objective; and
   voltage applying means, responsive to said detecting means, for applying a voltage to the piezo-ceramic elements in accordance with the vibration state of the objective so as to induce vibrations in said vibration members and reduce an amplitude of vibrations of the objective.

2. The vibration absorbing apparatus according to claim 1, wherein said vibration member includes an additional mass.

3. The vibration absorbing apparatus according claim 1, wherein said vibration member is composed of a band-like spring material made from a metal or a plastic.

4. The vibration absorbing apparatus according to claim 1, wherein said piezo-ceramic element is made from barium titanate, lead titanium zirconate or Rochelle salt.

5. The vibration absorbing apparatus according to claim 1, wherein said voltage applying means comprises a signal amplifier circuit, a waveform processor, and waveform generator, a phase control circuit and a power amplifier circuit.

6. The vibration absorbing apparatus according to claim 1, wherein said voltage applying means comprises a signal amplifier circuit, a phase control circuit and a power amplifier circuit.

* * * * *